US012363202B2

(12) United States Patent
Watanabe

(10) Patent No.: US 12,363,202 B2
(45) Date of Patent: Jul. 15, 2025

(54) INFORMATION COLLECTION SYSTEM AND INFORMATION PROCESSING APPARATUS

(71) Applicant: FUJIFILM Business Innovation Corp., Tokyo (JP)

(72) Inventor: Tsuyoshi Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 679 days.

(21) Appl. No.: 17/156,641

(22) Filed: Jan. 25, 2021

(65) Prior Publication Data

US 2022/0060554 A1    Feb. 24, 2022

(30) Foreign Application Priority Data

Aug. 20, 2020  (JP) ................................ 2020-139194

(51) Int. Cl.
*H04L 29/08*    (2006.01)
*H04L 9/40*    (2022.01)
(Continued)

(52) U.S. Cl.
CPC ........ *H04L 67/561* (2022.05); *H04L 63/0876* (2013.01); *H04L 67/303* (2013.01); *H04L 67/566* (2022.05)

(58) Field of Classification Search
CPC . H04L 67/561; H04L 63/0876; H04L 67/303; H04L 67/566; H04L 63/166;
(Continued)

(56) References Cited

U.S. PATENT DOCUMENTS 10,314,088 B2 *  6/2019  Pathuri ................ H04W 48/08
10,764,954 B2     9/2020  Zhang et al.
(Continued)

FOREIGN PATENT DOCUMENTS

JP    2014131213    7/2014
JP    2017532863    11/2017

OTHER PUBLICATIONS

"Office Action of Japan Counterpart Application", issued on Jun. 4, 2024, with English translation thereof, pp. 1-5.

*Primary Examiner* — Brian J. Gillis
*Assistant Examiner* — Juan C Turriate Gastulo
(74) *Attorney, Agent, or Firm* — JCIPRNET

(57) ABSTRACT

An information collection system includes a collection apparatus, and one or more proxy apparatuses, in which the collection apparatus collects information from a terminal by communication using a first communication method, in a case where the information is not collected from the terminal in the communication, transmits an information collection request for the terminal to the one or more proxy apparatuses by communication using a second communication method, and collects the information of the terminal with which any of the one or more proxy apparatuses responds in accordance with the information collection request, and the proxy apparatus responds to the collection apparatus with the collected information in a case where the information is collected from the terminal by communication using the first communication method in accordance with the information collection request from the collection apparatus.

10 Claims, 11 Drawing Sheets

(51) Int. Cl.
*H04L 67/303* (2022.01)
*H04L 67/561* (2022.01)
*H04L 67/566* (2022.01)

(58) Field of Classification Search
CPC ....... H04L 67/288; H04L 67/02; H04L 67/12; H04W 4/80; G16Y 20/00; H04Q 9/00
See application file for complete search history.

(56) References Cited

U.S. PATENT DOCUMENTS

| | | |
|---|---|---|
| 10,959,280 B2 | 3/2021 | Zhang et al. |
| 11,445,566 B2 | 9/2022 | Zhang et al. |
| 11,729,853 B2 | 8/2023 | Zhang et al. |
| 2017/0068785 A1* | 3/2017 | Experton ............... H04W 12/02 |
| 2017/0160319 A1* | 6/2017 | Dibb ................... G01R 21/133 |
| 2017/0280495 A1* | 9/2017 | Zhang .................. H04W 76/10 |
| 2018/0376448 A1* | 12/2018 | Wild ................... H04W 68/005 |
| 2019/0132396 A1* | 5/2019 | Finnegan ............ H04L 12/2818 |
| 2020/0288514 A1* | 9/2020 | Uchida ................ H04W 76/14 |
| 2021/0044315 A1* | 2/2021 | Luo ....................... H04B 1/401 |

* cited by examiner

FIG. 4

| Service | | UUID | Permission | Security | Value |
|---|---|---|---|---|---|
| | | 1BA1EEF4-E76C-4D5B-A7C4-5086DB143B44 | | | |
| Characteristic | EMPLOYEE ID | 5F2112A1-B5E5-4786-81A1-9973A886338F | READABLE | NO | AZ3857 |
| | HEART RATE | 147BE099-6B56-4DC3-BCDC-E6FC5BC52BAB | READABLE | NO | 70 |
| | BODY TEMPERATURE | 16020D5F-51DE-465A-87BB-5DD7E81FF2F5 | READABLE | NO | 36.2 |

FIG. 5

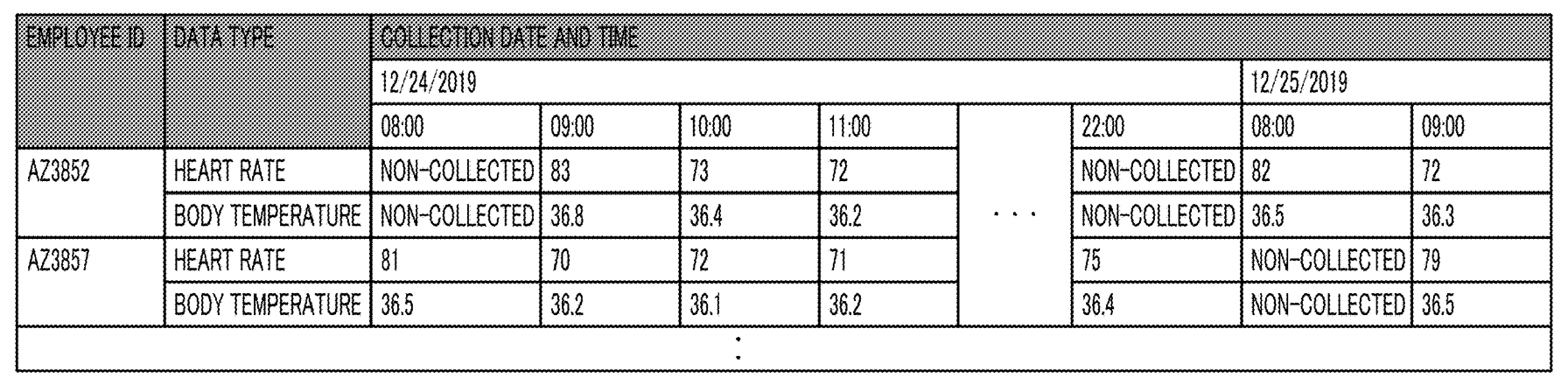

| EMPLOYEE ID | DATA TYPE | COLLECTION DATE AND TIME | | | | | | |
|---|---|---|---|---|---|---|---|---|
| | | 12/24/2019 | | | | | 12/25/2019 | |
| | | 08:00 | 09:00 | 10:00 | 11:00 | ... | 22:00 | 08:00 | 09:00 |
| AZ3852 | HEART RATE | NON-COLLECTED | 83 | 73 | 72 | | NON-COLLECTED | 82 | 72 |
| | BODY TEMPERATURE | NON-COLLECTED | 36.8 | 36.4 | 36.2 | | NON-COLLECTED | 36.5 | 36.3 |
| AZ3857 | HEART RATE | 81 | 70 | 72 | 71 | | 75 | NON-COLLECTED | 79 |
| | BODY TEMPERATURE | 36.5 | 36.2 | 36.1 | 36.2 | | 36.4 | NON-COLLECTED | 36.5 |

FIG. 8

| Service | | UUID | Permission | Security | Value |
|---|---|---|---|---|---|
| | | 1BA1EEF4-E76C-4D5B-A7C4-5086DB143B44 | | | |
| Characteristic | EMPLOYEE ID | 5F2112A1-B5E5-4786-81A1-9973A886338F | READABLE | NO | AZ3857 |
| | HEART RATE | 147BE099-6B56-4DC3-BCDC-E6FC5BC52BAB | READABLE | YES | 70 |
| | BODY TEMPERATURE | 16020D5F-51DE-465A-87BB-5DD7E81FF2F5 | READABLE | YES | 36.2 |
| | TRANSMISSION DESTINATION | F413E082-CD1D-4AF2-AE08-F13A5430747F | WRITABLE | YES | 192.168.0.100 |
| | TRANSMISSION REQUEST | 19AEBFB6-6AF5-4A8B-89F5-6B45B6A69D81 | WRITABLE | NO | OFF |

INFORMATION COLLECTION SYSTEM AND INFORMATION PROCESSING APPARATUS

CROSS-REFERENCE TO RELATED APPLICATIONS

This application is based on and claims priority under 35 USC 119 from Japanese Patent Application No. 2020-139194 filed Aug. 20, 2020.

BACKGROUND

(i) Technical Field

The present invention relates to an information collection system and an information processing apparatus.

(ii) Related Art

A system that collects and analyzes information via a network from terminals such as sensors present at various locations has been widely used along with development of Internet of things (IoT) technology. In addition, there is a system that collects information from moving terminals via a mobile phone network or other wide area networks.

In a system disclosed in JP2014-131213A, a transfer device transmits and receives information with a mobile terminal by short-range wireless communication. In a case where the mobile terminal becomes out of range of short-range wireless communication, the transfer device searches for a communication station that can perform short-range wireless communication. In a case where the communication station is detected, information is transmitted and received with the mobile terminal via the communication station.

SUMMARY

In a case where a collection apparatus collects information from a terminal by communication using a first communication method, information cannot be collected from the terminal in a case where the terminal leaves outside a communicable range of the collection apparatus in the first communication method.

Aspects of non-limiting embodiments of the present disclosure relate to an information collection system and an information processing apparatus that cause a collection apparatus to be capable of collecting information from a terminal even in a case where the terminal is present outside a communicable range of the collection apparatus in a first communication method.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information collection system comprising a collection apparatus, and one or more proxy apparatuses, in which the collection apparatus collects information from a terminal by communication using a first communication method, in a case where the information is not collected from the terminal in the communication, transmits an information collection request for the terminal to the one or more proxy apparatuses by communication using a second communication method, and collects the information of the terminal with which any of the one or more proxy apparatuses responds in accordance with the information collection request, and the proxy apparatus responds to the collection apparatus with the collected information in a case where the information is collected from the terminal by communication using the first communication method in accordance with the information collection request from the collection apparatus.

BRIEF DESCRIPTION OF THE DRAWINGS

Exemplary embodiment(s) of the present invention will be described in detail based on the following figures, wherein:

FIG. 4 is a diagram illustrating a data content of a GATT service of the terminal;

FIG. 5 is a diagram illustrating a data content of a database of a collection apparatus;

FIG. 8 is a diagram illustrating a data content of a GATT service of a terminal of a modification example;

DETAILED DESCRIPTION

Summary of System

Figure 1:
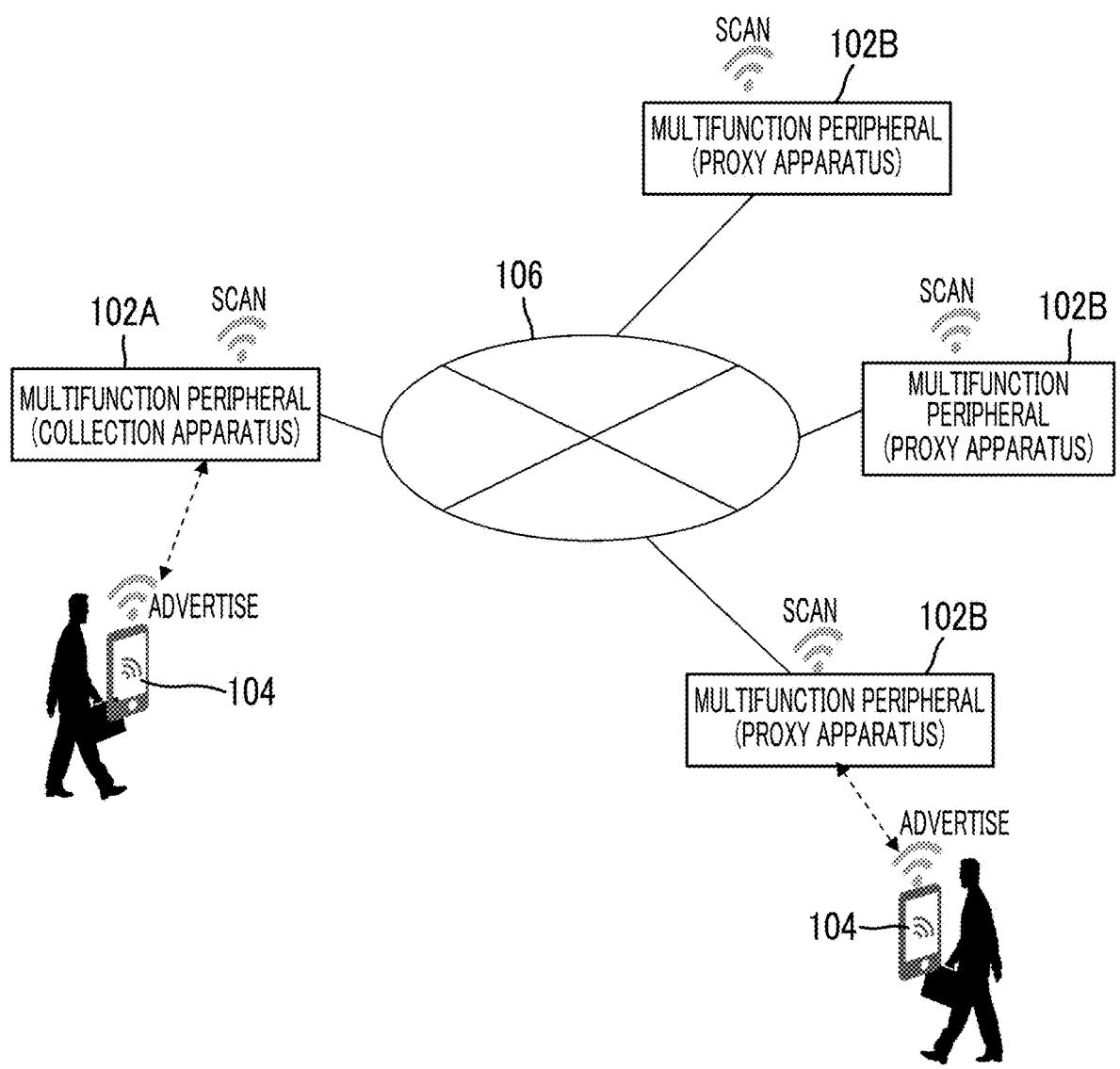
FIG. 1 is a diagram illustrating a system configuration of an exemplary embodiment.

FIG. 1 illustrates one exemplary embodiment of an information collection system using a system disclosed in the present specification. For example, this system is assumed to be a system for managing health of employees working at an office.

This system includes multifunction peripherals 102A and 102B that can communicate with each other via a network 106 such as a local area network of the office. The multifunction peripherals 102A and 102B are multifunction apparatuses having a printer, a scanner, a copier, a facsimile, an information processing function, and a network communication function.

In the example in FIG. 1, each individual user, that is, each individual employee, carries a terminal 104. In this example, for example, the terminal 104 is assumed to be a wearable terminal such as a smart watch on which a heart rate sensor, a body temperature sensor, and the like are mounted. For example, these sensors incorporated in the terminal 104 periodically measure a heart rate, a body temperature, and the like of the employee wearing the terminal 104 and generate information indicating a measurement result.

In the example in FIG. 1, one multifunction peripheral 102A of a plurality of the multifunction peripherals 102A and 102B functions as a collection apparatus that collects information such as the heart rate from a group of the terminals 104.

Collection of information from the terminal 104 is performed using short-range wireless communication consuming low power in order to save power of the terminal 104. In the following description, for example, Bluetooth Low Energy (BLE) will be assumed to be used as a specific example of the short-range wireless communication (Bluetooth is a registered trademark). That is, the short-range wireless communication (for example, BLE) is an example of communication using a first communication method used for collecting information from the multifunction peripherals 102A and 102B and the terminal 104.

In a case of using BLE in communication for information collection, the terminal 104 operates as a BLE peripheral and provides information of the measurement results of the group of sensors to a central as a generic attribute profile (GATT) server. The multifunction peripheral 102A that is the collection apparatus operates as the central, connects to the terminal 104 that is the GATT server using a BLE protocol, and acquires information such as the heart rate from the terminal 104.

The short-range wireless communication such as BLE has a short communication distance. Thus, when the employee carrying the terminal 104 is present outside a communicable range of the multifunction peripheral 102A in BLE, the multifunction peripheral 102A cannot collect information from the terminal 104. In such a case, the multifunction peripheral 102A collects information of the terminal 104 from the other multifunction peripheral 102B via the network 106 in the present exemplary embodiment. That is, the multifunction peripheral 102B near the terminal 104 collects information from the terminal 104 using BLE as a proxy of the multifunction peripheral 102A and transmits the collected information to the multifunction peripheral 102A. The multifunction peripheral 102B that collects information from the terminal 104 using BLE as the proxy of the multifunction peripheral 102A which is the collection apparatus will be referred to as a proxy apparatus.

Communication between the multifunction peripheral 102A and the multifunction peripheral 102B via the network such as the LAN is one example of communication using a second communication method used for the collection apparatus to transmit an information collection request to the proxy apparatus. The second communication method has a longer communication distance than the first communication method. From another viewpoint, the first communication method saves more power than the second communication method.

Hardware Configuration

Figure 2:
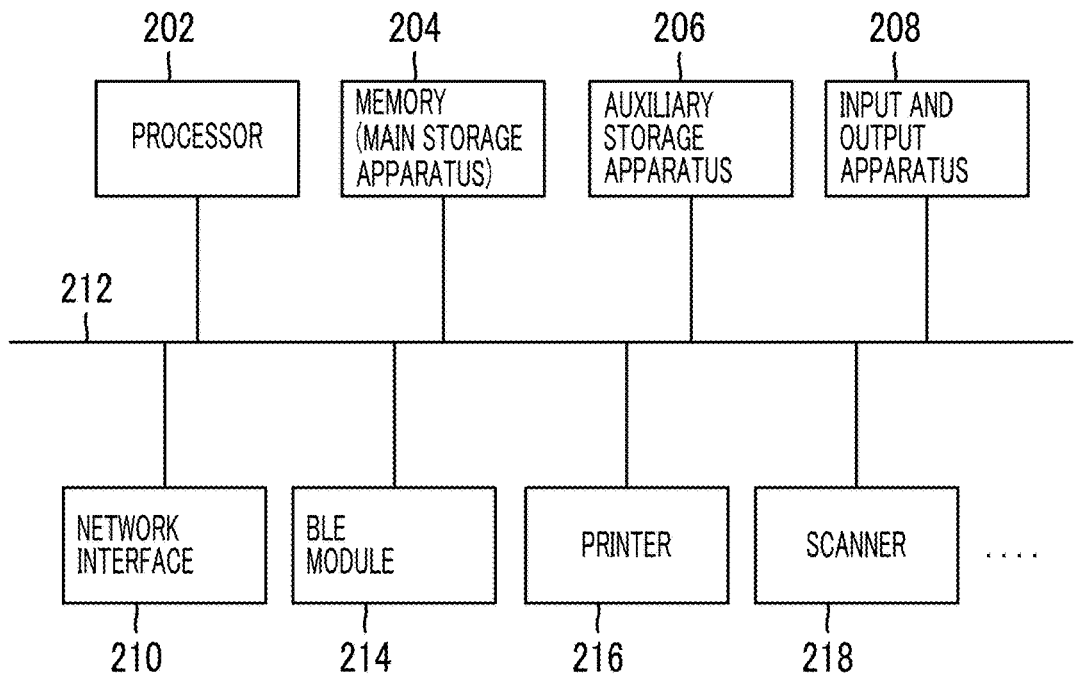
FIG. 2 is a diagram illustrating a hardware configuration of a multifunction peripheral.

One example of a basic portion of a hardware configuration of the multifunction peripherals 102A and 102B is illustrated in FIG. 2. The multifunction peripherals 102A and 102B illustrated in FIG. 2, as hardware constituting an incorporated computer, have a circuit configuration in which a processor 202, a memory (main storage apparatus) 204 such as a random access memory (RAM), a controller that controls an auxiliary storage apparatus 206 that is a nonvolatile storage apparatus such as a flash memory, a solid state drive (SDD), or a hard disk drive (HDD), an interface for various input and output apparatuses 208, a network interface 210 that performs a control for connecting to the network such as the local area network, and the like are connected via a data transfer path such as a bus 212. For example, the input and output apparatuses 208 include an input apparatus such as a touch panel that doubles as a display apparatus, and a voice output apparatus such as a speaker. The circuit configuration of the part described above maybe the same as a general-purpose computer.

In addition, the multifunction peripherals 102A and 102B include a BLE module 214, a printer 216, a scanner 218, and the like that are connected to computer hardware of the multifunction peripherals 102A and 102B via the bus 212 or the like. The BLE module 214 is a wireless communication module for the short-range wireless communication complying with the BLE protocol. The printer 216 and the scanner 218 are mechanisms for copy, print, and scan functions of the multifunction peripherals 102A and 102B.

The part of the computer hardware of the multifunction peripherals 102A and 102B executes processing for a user interface (UI), a control for exchanging data via the network, and information processing for controlling various functional elements such as the scanner, the printer, and the facsimile apparatus. In addition, the part of the computer hardware executes a processing procedure as the collection apparatus and a processing procedure as the proxy apparatus described above and later. A program in which contents of these various processing procedures are described is installed on the computer hardware via the network or the like and stored in the auxiliary storage apparatus 206. An information processing apparatus of this exemplary embodiment is implemented by executing the program stored in the auxiliary storage apparatus 206 by the processor 202 using the memory 204.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Figure 3:
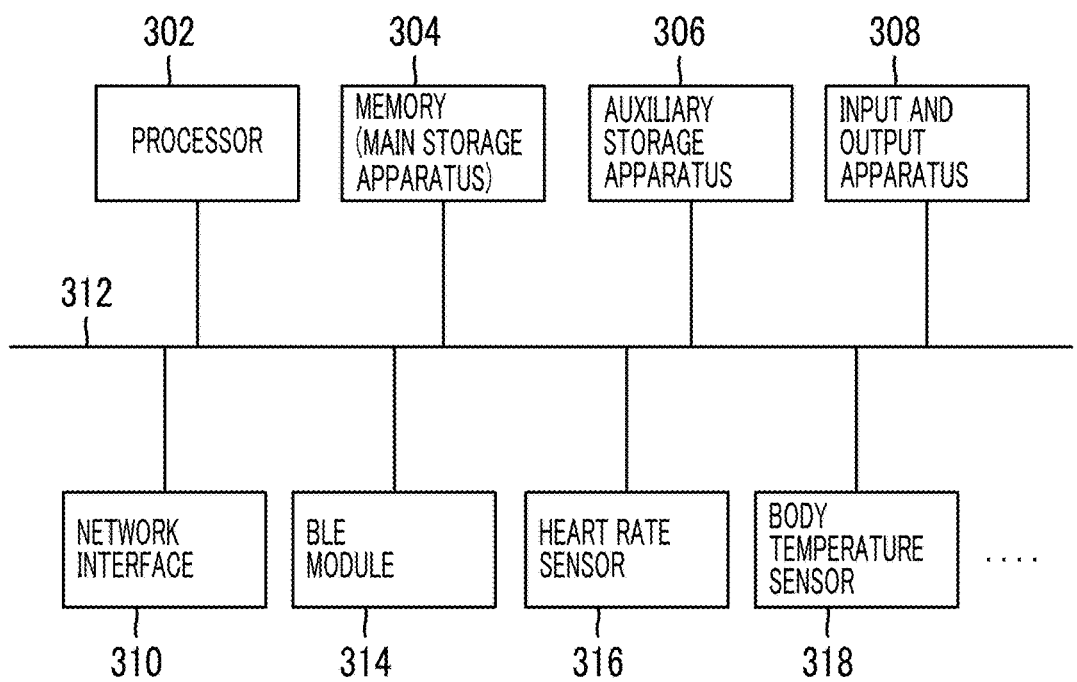
FIG. 3 is a diagram illustrating a hardware configuration of a terminal.

One example of a basic portion of a hardware configuration of the terminal 104 is illustrated in FIG. 3. In the example in FIG. 3, the terminal 104 has a circuit configuration in which a processor 302, a memory 304 such as a RAM, a controller that controls an auxiliary storage apparatus 306 such as a flash memory, an interface for input and output apparatuses 308 such as a display and a touch input apparatus, a network interface 310, a BLE module 314, and the like are connected via a data transfer path such as a bus 312. In addition, the processor 302 is connected to a heart rate sensor 316 and a body temperature sensor 318 via a predetermined interface. The heart rate sensor 316 measures the heart rate of the employee wearing the terminal 104, and the body temperature sensor 318 measures the body temperature of the employee. The network interface 310 is an interface for network communication via a local area network or the like. The network interface 310 has a function of wireless communication such as Wi-Fi (trademark) having a longer communication distance than the short-range wireless communication such as BLE. The terminal 104 may not include the network interface 310.

A program in which a procedure of information processing of the terminal 104 described later is described is installed in the auxiliary storage apparatus 306 of the terminal 104. The processor 302 implements information processing for the present exemplary embodiment by executing the program while using the memory 304 as a work area.

For example, FIG. 4 illustrates a specific example of data stored in the auxiliary storage apparatus 306 for the GATT service of the terminal 104 for health management of the employee in this example. This data includes a universally unique identifier (UUID) that is identification information of the service, and information of characteristics used in the service. This service includes three characteristics of an employee ID, a heart rate, and a body temperature. Each individual characteristic has four attribute values of UUID, Permission, Security, and Value. The UUID of the characteristic is identification information of information indicated by the characteristic. The Permission is a permission of the central (in this example, the collection apparatus or the proxy apparatus) for a value (Value) of the characteristic. In the illustrated example, the Permission of the three characteristics is "readable". The Security indicates whether or not to protect information for the characteristic. In the illustrated example, Security of the three characteristics is "No", and this indicates that protection is not necessary for the characteristics. The Value is the value of the characteristic. Particularly, the value of the characteristic "employee ID" functions as identification information of the terminal 104 storing data of the GATT service. The illustrated example shows that an employee having an employee ID (ID is the identification information) "AZ3857" has a heart rate of "70" and a body temperature of 36.2° C.

FIG. 5 illustrates an example of a data content of a database storing information collected from each terminal 104 by the multifunction peripheral 102A. In this example, the multifunction peripheral 102A collects information from each terminal 104 at every hour from 08:00 to 22:00 on each business day of a company. In this database, the heart rate and the body temperature of each employee at every hour are recorded in association with the employee ID. In the database, "non-collected" is recorded for a time at which the information is not collected.

Operation of System

Next, an example of a detailed operation of the system of this exemplary embodiment will be described.

First, each terminal 104 of this system periodically executes advertising in accordance with the BLE protocol. In the advertising, an advertising packet that includes the UUID (in this example, "1BA1EEF4-E76C-4D5B-A7C4-5086DB143B44") of the health management service of a target is broadcasted.

Figure 6:
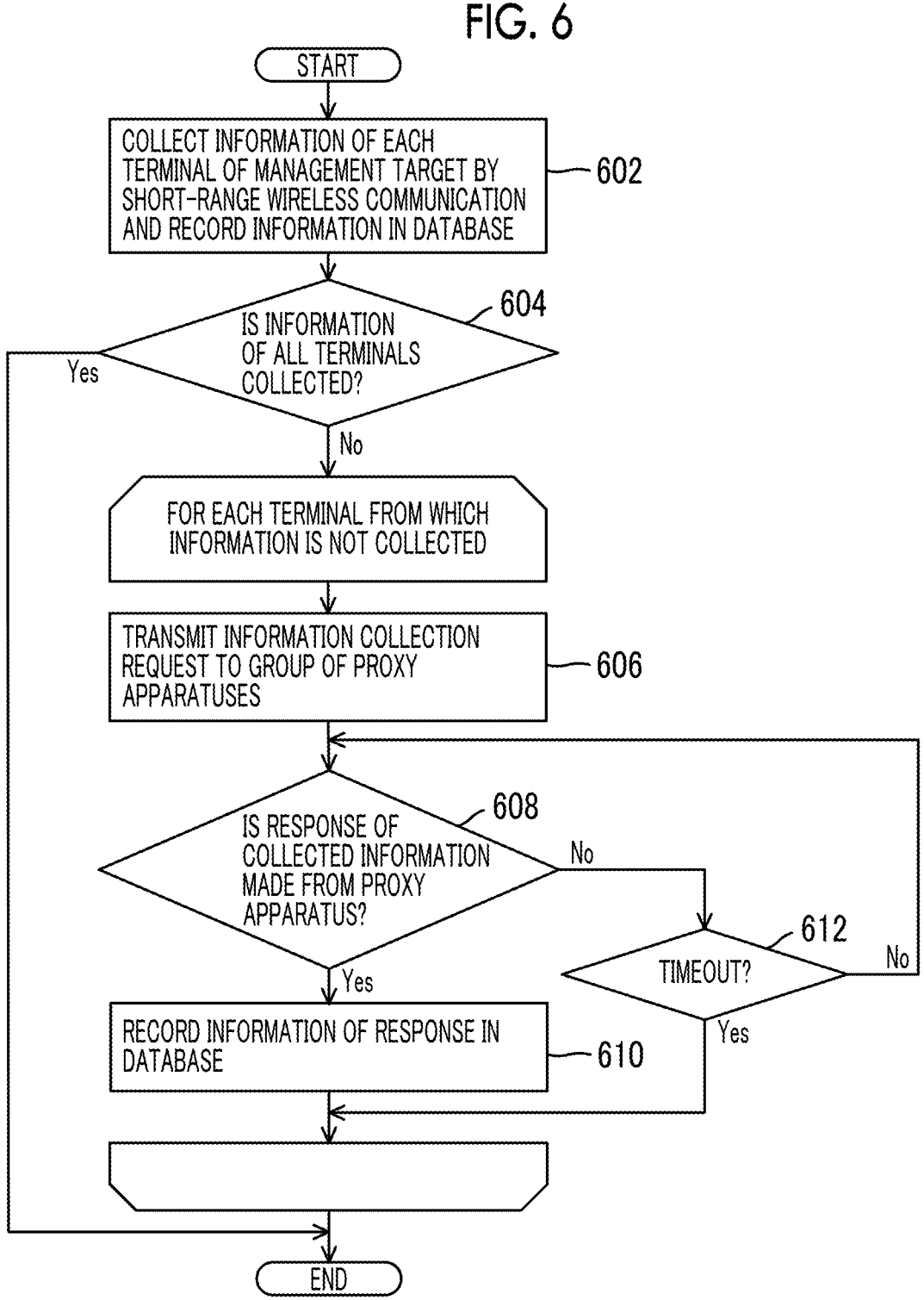
FIG. 6 is a diagram illustrating a processing procedure executed by the collection apparatus.

The multifunction peripheral 102A which is the collection apparatus executes a procedure of information collection illustrated in FIG. 6 at every hour.

In this procedure, in a case where every hour that is a timing for information collection is reached, the multifunction peripheral 102A collects information from each terminal 104 of a management target using the BLE protocol and records the collected information in the database (refer to FIG. 5) (602). More specifically, in a case where the timing for information collection is reached, the multifunction peripheral 102A scans for the UUID of the service in accordance with the BLE protocol. Accordingly, each terminal 104 that advertises the UUID is found. The multifunction peripheral 102A reads the value of each characteristic, that is, the employee ID, the heart rate, and the body temperature, of each found terminal 104 and records the value in the database as data of the timing. The multifunction peripheral 102A has a list of the identification information, that is, the employee ID, of each terminal 104 that is a management target, and collects information from the terminal 104 of each employee ID in the list at the timing for collection.

Next, the multifunction peripheral 102A determines whether or not information is collected from all terminals 104 of the management target in Block 602 (604), and finishes processing in a case where a determination result is Yes. Meanwhile, in a case where a determination result of Block 604 is No, the multifunction peripheral 102A executes processing of Blocks 606 to 612 for each terminal 104 from which information is not collected at the current timing.

That is, the multifunction peripheral 102A selects one terminal 104 from which information is not collected, generates an information collection request for the terminal 104, and transmits the information collection request to each multifunction peripheral 102B (that is, the proxy apparatus) on the network 106 (606). This transmission may be performed by multicasting on the local area network or may be performed using other methods. For example, the information collection request transmitted at this time is a character string in the JavaScript Object Notation (JSON) format illustrated as follows (JavaScript is a registered trademark).

{"Service UUID": "1BA1EEF4-E76C-4D5B-A7C4-5086DB143B44",
"Identification Characteristic UUID": "5F2112A1-B5E5-4786-81A1-9973A886338F",
"Identification Characteristic Value": "AZ3857",
"Required Characteristic UUIDs": ["147BE099-6B56-4DC3-BCDC-E6FC5BC52BAB", "16020D5F-51DE-465A-87BB-5DD7E81FF2F5"]}

The illustrated information collection request includes the UUID of the above health management service as a value of the UUID ("Service UUID") of the service. The information collection request includes a value "5F2112A1-B5E5-4786-81A1-9973A886338F" of the UUID ("Identification Characteristic UUID") of the identification information (that is, the employee ID) of the terminal 104 that is a target of the request, and a designation of a value "AZ3857" that the Value ("Identification Characteristic Value") of the identification information is to have. Furthermore, the information collection request includes a list of the UUIDs ("Required Characteristic UUIDs") of the characteristics to be collected. In this example, the list includes the UUIDs of the heart rate and the body temperature.

Then, the multifunction peripheral 102A waits for a return of a response to the information collection request from any multifunction peripheral 102B (608). In a case where a determination that the response is returned is made in Block 608, the multifunction peripheral 102A records information included in the response, that is, information of the heart rate and the body temperature collected from the terminal 104 by the multifunction peripheral 102B, in the database (610) and finishes processing for the terminal 104. Waiting for the response in Block 608 is repeated until a timeout occurs (a determination result of 612 is Yes). In a case where the timeout occurs, the multifunction peripheral 102A finishes processing for the terminal 104.

Figure 7:
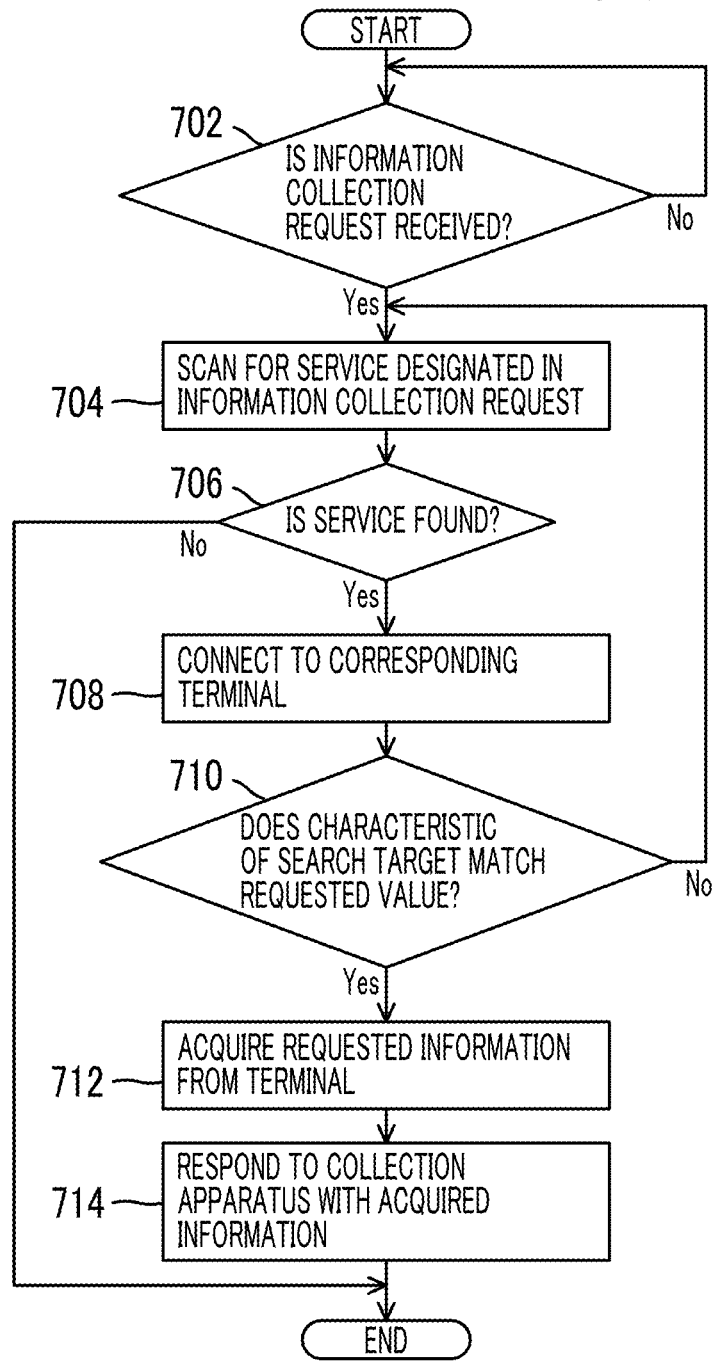
FIG. 7 is a diagram illustrating a processing procedure executed by a proxy apparatus.

FIG. 7 illustrates a processing procedure of the multifunction peripheral 102B which is the proxy apparatus.

In this procedure, the multifunction peripheral 102B waits for reception of the information collection request from the multifunction peripheral 102A (702). In a case where the information collection request is received (a determination result of 702 is Yes), the UUID of the service for which an instruction is provided in the request is scanned for a predetermined time period (704), and the terminal 104 advertising the UUID is searched for. The multifunction peripheral 102B determines whether or not the terminal 104 is found in this scan (706), and processing is finished in a case where the terminal 104 is not found.

In a case where a determination result of Block 706 is Yes, the multifunction peripheral 102B connects to the found terminal 104 (708). Next, the multifunction peripheral 102B reads the values of the characteristics of a search target designated in the information collection request from the terminal 104 and determines whether or not the values match the values designated in the information collection request (710). In a case where a determination result of Block 710 is No, the multifunction peripheral 102B returns to Block 704.

In a case where the determination result of Block 710 is Yes, the multifunction peripheral 102B reads the values of the characteristics of a request target designated in the information collection request (712) and responds to the multifunction peripheral 102A of a request source with each read value as data in, for example, the JSON format (714).

For example, in a case of the information collection request illustrated above, the multifunction peripheral 102B searches for the terminal 104 advertising the UUID "1BA1EEF4-E76C-4D5B-A7C4-5086DB143B44" in Block 704. In addition, in this example, the UUID (="Identification Characteristic UUID") of the employee ID that is a characteristic of the search target is "5F2112A1-B5E5-4786-81A1-9973A886338F". Therefore, the multifunction peripheral 102B reads the Value of the characteristic having the UUID "5F2112A1-B5E5-4786-81A1-9973A886338F" in Block 710 and determines whether or not the value matches the value "AZ3857" shown in the information collection request. In Block 712, the multifunction peripheral 102B reads the Values of two characteristics having UUIDs "147BE099-6B56-4DC3-BCDC-E6FC5BC52BAB" and "16020D5F-51DE-465A-87BB-5DD7E81FF2F5" and responds to the multifunction peripheral 102A with each read value. For example, in a case where the terminal 104 found in Blocks 704 and 706 has the data of the GATT service illustrated in FIG. 4, the response in the JSON format transmitted by the multifunction peripheral 102B in Block 714 is as follows.

{"Service UUID": "1BA1EEF4-E76C-4D5B-A7C4-5086DB143B44",
"Identification Characteristic UUID": "5F2112A1-B5E5-4786-81A1-9973A886338F",
"Identification Characteristic Value": "AZ3857",
"Required Characteristics": [
{"UUID": "147BE099-6B56-4DC3-BCDC-E6FC5BC52BAB",
"Value": "70"},
{"UUID": "16020D5F-51DE-465A-87BB-5DD7E81FF2F5",
"Value": "36.2"}]}

In this response, the requested characteristics, that is, the values "70" and "36.2" of the heart rate and the body temperature, are shown in addition to the UUID of the service and the UUID and the value of the employee ID for identifying the terminal 104.

In one example, the information collected from the group of terminals 104 of the management target by the collection apparatus as described above is accumulated in the database incorporated in the collection apparatus and analyzed by the collection apparatus. In another example, the collection apparatus may transfer the information collected from the group of terminals 104 to a predetermined analysis system on the network. In this case, the analysis system accumulates the information transferred from the collection apparatus in a database and performs a predetermined type of analysis processing on the accumulated information.

In the system described above, even in a case where the collection apparatus cannot collect information from the terminal 104 by the short-range wireless communication, information is collected from the terminal 104 via the proxy apparatus via the network such as the LAN in a case where the terminal 104 is near any proxy apparatus.

While an example in which the health management service is a target is illustrated above, the present system can also be applied to a case of collecting information for other services.

In addition, the system including the collection apparatus and the proxy apparatus for information collection for a certain service is considered to be required to collect information for other services (for example, a service for managing a group of terminals generating information for different purposes from health management; referred to as a second service). In such a case, implementation of the collection apparatus and the proxy apparatus needs to be changed for the second service. However, a workload for changing the implementation is high. Meanwhile, in the present exemplary embodiment, the implementation of the proxy apparatus does not need to be changed even in a case of adding a service of the target. The proxy apparatus searches for the terminal 104 corresponding to the information collection request from the collection apparatus and performs typical processing of reading a necessary characteristic from the terminal 104 in a case where the terminal 104 is found. Even in a case where a new service is added, the proxy apparatus may perform the same typical processing for the service. In a case of adding the new service, the collection apparatus may change or add a program to assign a unique UUID to the service and generate the information collection request to collect information necessary for the service.

While a case where the multifunction peripheral 102A is the collection apparatus and the multifunction peripheral 102B is the proxy apparatus is illustratively described above, such a case is merely one example. Functions of both of the collection apparatus and the proxy apparatus may be implemented in the multifunction peripherals 102A and 102B, and for example, the individual multifunction peripherals 102A and 102B may be switched to function as any of two of the collection apparatus and the proxy apparatus for each service. In this case, in a case where a processing procedure as the collection apparatus is installed, the multifunction peripherals 102A and 102B execute the processing procedure. In a case where the information collection request is received from the other multifunction peripheral 102A or 102B, the multifunction a processing procedure as the proxy apparatus is executed.

MODIFICATION EXAMPLE

The information collected in the service of the target by the system may be of a type requiring confidentiality (that is, secrecy) like personal information. The heart rate and the body temperature of the employee collected in the service for managing the health of the employee illustrated above are one type of personal information and may be a confidentiality target.

The collection apparatus is necessary for collecting information for the service, and collection of the information by the collection apparatus even in a case where the information is the confidentiality target is a matter understood by a provider side of the information. Meanwhile, the proxy apparatus can be added to the system at any time, and which proxy apparatus is to be used in a case of information collection is generally not known in advance. The provider side of the information may not want the information of the confidentiality target to be acquired even temporarily by the proxy apparatus that cannot be predicted in advance.

Therefore, in this modification example, in a case where the information to be collected is the confidentiality target, the proxy apparatus provides the terminal 104 with an instruction (hereinafter, referred to as a "confidentiality transmission instruction") to directly (that is, not via the proxy apparatus) transmit the information to the collection apparatus, instead of collecting the information from the terminal 104. The terminal 104 that receives the confidentiality transmission instruction transmits information (for example, the most recent measurement value of the heart rate sensor) stored in the GATT service of the terminal 104 to the collection apparatus via, for example, Wi-Fi (trademark).

In order to perform such direct transmission, the network interface 310 having the Wi-Fi communication function needs to be mounted on the terminal 104. In addition, the terminal 104 needs to store a communication address (for example, an IP address) of the collection apparatus for direct transmission. Thus, for example, the terminal 104 may acquire and store the communication address from the collection apparatus in a case of registering the terminal 104 in the collection apparatus as the management target, like when, for example, the terminal 104 is paired with the collection apparatus. By registering the communication address of the collection apparatus in the terminal 104 at a time of pairing with the collection apparatus, direct transmission of information from the terminal 104 to an apparatus (for example, the proxy apparatus) that a user of the terminal 104 does not assume to collect information from the terminal 104 is prevented.

Normally, the terminal 104 may disable the Wi-Fi communication function for power saving. In this case, the terminal 104 enables the Wi-Fi communication function only in a case of directly transmitting information to the collection apparatus in accordance with the confidentiality transmission instruction from the proxy apparatus.

FIG. 8 illustrates information stored in the terminal 104 for the GATT service in this modification example. The example in FIG. 8 is an example of data of the terminal 104 for the same health management service as the example in FIG. 4. The data illustrated in FIG. 8 is obtained by adding two characteristics of a transmission destination and a transmission request to the data illustrated in FIG. 4. The transmission destination is the communication address of the collection apparatus that is a transmission destination of information in a case of receiving the confidentiality transmission instruction from the proxy apparatus, and the Permission is set to "writable" for the transmission destination. In the illustrated example, an IP address "192.168.0.100" (merely one example) that is acquired from the collection apparatus at a time of pairing or the like is stored as a value of the transmission destination. The transmission request is a characteristic for recording provision of the confidentiality transmission instruction from the proxy apparatus, and the Permission is set to "writable" for the transmission request. A default value of the transmission request is "OFF". The confidentiality transmission instruction is output to the terminal 104 by rewriting the value of the transmission request with "ON" by the proxy apparatus. In addition, a value of the attribute Security is set to "Yes" for the heart rate, the body temperature, and the transmission destination among the characteristics illustrated in FIG. 8. For these characteristics, the terminal 104 does not receive a read request from an apparatus (for example, the proxy apparatus) other than the collection apparatus.

A processing procedure of the multifunction peripheral 102A (that is, the collection apparatus) in this modification example will be described with reference to FIG. 9 and FIG. 10. For example, the example in FIG. 9 and FIG. 10 is an example in a case where whether or not the information to be collected is the confidentiality target is determined in units of services.

Figure 9:
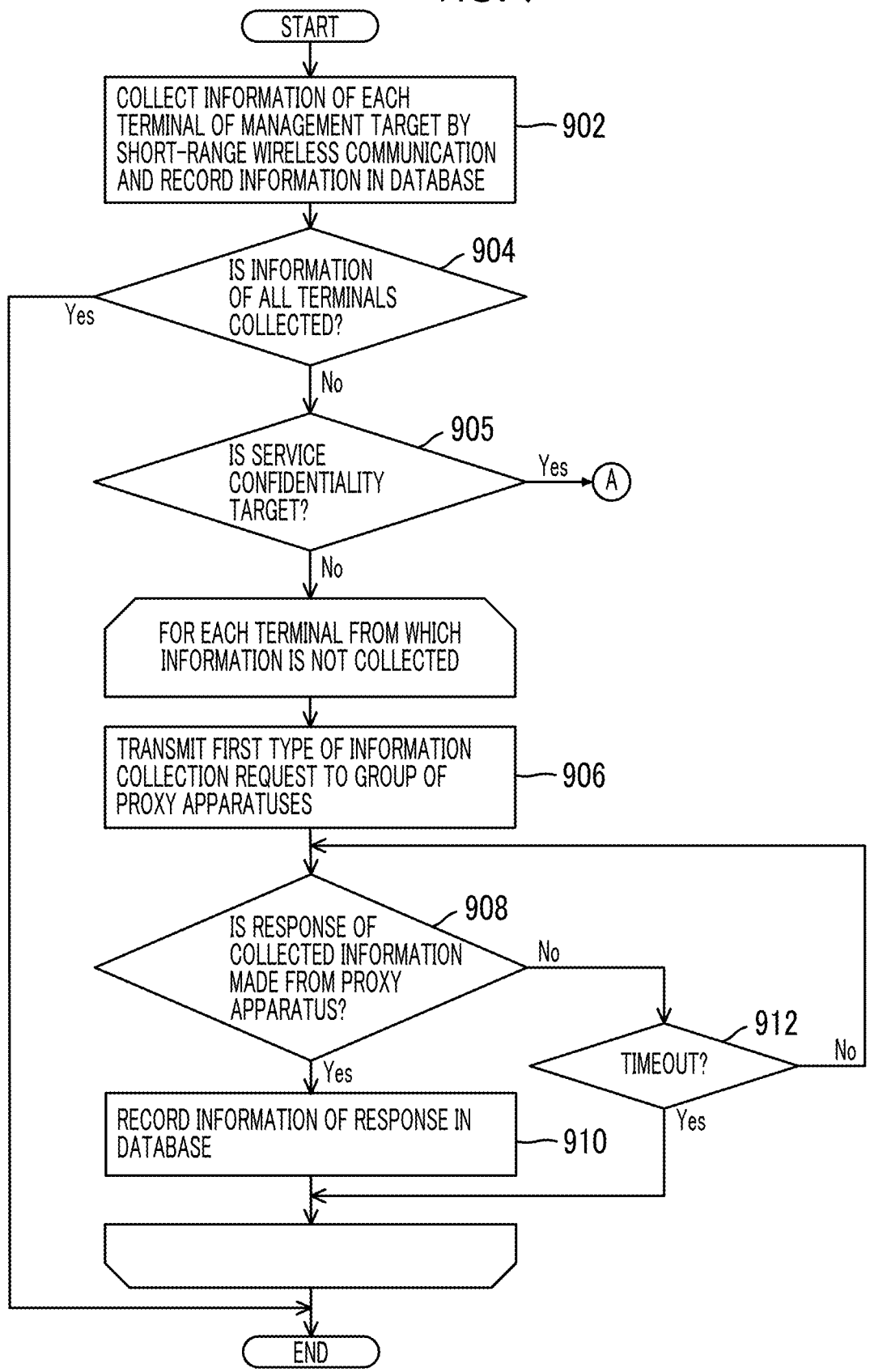
FIG. 9 is a diagram illustrating a part of a processing procedure executed by a collection apparatus of the modification example.
Figure 10:
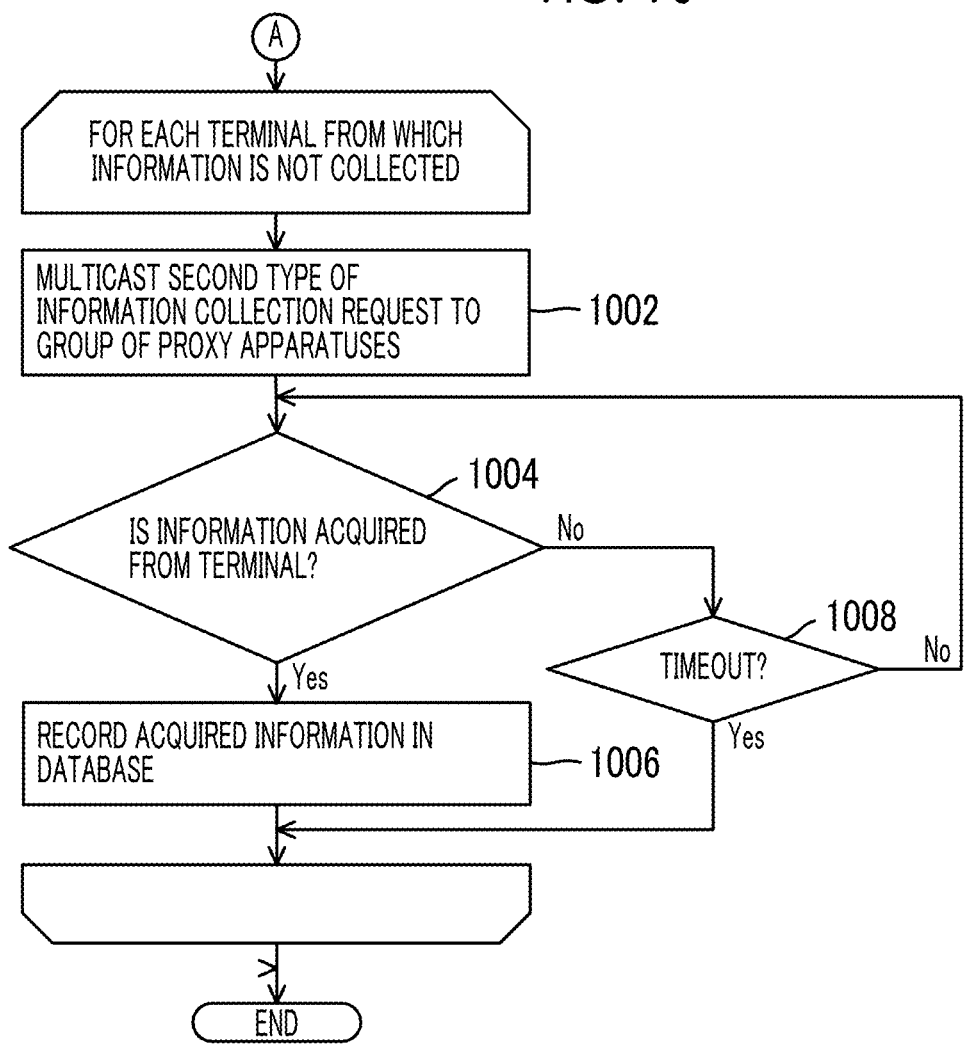
FIG. 10 is a diagram illustrating a remaining part of the processing procedure executed by the collection apparatus of the modification example.

In the procedure in FIG. 9, Blocks 902, 904, 906, 908, 910, and 912 are the same processing as Blocks 602, 604, 606, 608, 610, and 612 illustrated in FIG. 6.

In the procedure in FIG. 9, in a case where the timing for information collection for a certain service is reached, the multifunction peripheral 102A collects and records a predetermined type of information from the group of terminals 104 communicable by the short-range wireless communication (902). Next, in a case where the terminal 104 from which information is not collected in processing of Block 902 is present among the terminals 104 of the management target (a determination result of 904 is No), the multifunction peripheral 102A determines whether or not information of the service is the confidentiality target (905). Here, information that indicates whether or not information of the service is the confidentiality target is assumed to be registered in advance in the multifunction peripheral 102A for each service for which information is collected by the multifunction peripheral 102A.

In a case where a determination result of Block 905 is No, the multifunction peripheral 102A executes processing of Blocks 906 to 912 for each terminal 104 from which information is not collected at the current timing. While a first type of information collection request is transmitted to the multifunction peripheral 102B (that is, the proxy apparatus) in Block 906, this first type of information collection request is a request of the same type as the information collection request in the procedure in FIG. 6. That is, the first type of information collection request has a content of requesting the proxy apparatus to collect information from the terminal 104 of a target by the short-range wireless communication. In Blocks 908, 910, and 912 after the first type of information collection request is transmitted, the multifunction peripheral 102A waits for a response of information to the information collection request from any multifunction peripheral 102B in the same manner as the procedure in FIG. 6, and records the information in the database in a case where the response arrives.

In a case where the determination result of Block 905 is Yes, as illustrated in FIG. 10, the multifunction peripheral 102A executes processing of Blocks 1002 to 1008 for each terminal 104 from which information is not collected in Block 902. In Block 1002, the multifunction peripheral 102A selects one of the terminals 104 from which information is not collected, generates a second type of information collection request for the terminal 104, and transmits the second type of information collection request to each multifunction peripheral 102B on the network 106 using a method of multicasting or the like. The second type of information collection request is an information collection request that includes a confidentiality instruction. The confidentiality instruction is an instruction to require the proxy apparatus to transmit, to the terminal 104, the confidentiality transmission instruction that requires information of the terminal 104 to be directly transmitted to the collection apparatus. The proxy apparatus that receives the second type of information collection request transmits the confidentiality transmission instruction to the terminal 104 instead of requesting to collect information from the terminal 104 of the target. An example of the second type of information collection request described in the JSON format is illustrated below.

{"Service UUID": "1BA1EEF4-E76C-4D5B-A7C4-5086DB143B44",
"Identification Characteristic UUID": "5F2112A1-B5E5-4786-81A1-9973A886338F",
"Identification Characteristic Value": "AZ3857",
"Writable Characteristic UUID": "19AEBFB6-6AF5-4A8B-89F5-6B45B6A69D81",
"Writable Characteristic Value": "ON"}

This second type of information collection request includes the UUID of the service and the UUID and the Value of the characteristic for identifying the terminal 104 of the target, that is, the employee ID. In addition, this request includes a UUID ("19AEBFB6-6AF5-4A8B-89F5-6B45B6A69D81") of the transmission request that is a writable characteristic for recording the confidentiality transmission instruction, and a value ("ON") to be written into the characteristic. A set of the UUID and the value of the transmission request is an example of the confidentiality instruction.

After the second type of information collection request is transmitted, the multifunction peripheral 102A waits for transmission of information on the collection target from the terminal 104 of the target (1004). In a case where information is transmitted from the terminal 104, the information is recorded in the database (1006). In addition, the multifunction peripheral 102A monitors a timeout (1008) and finishes processing in FIG. 10 in a case where information is not transmitted from the terminal 104 until the timeout occurs.

Figure 11:
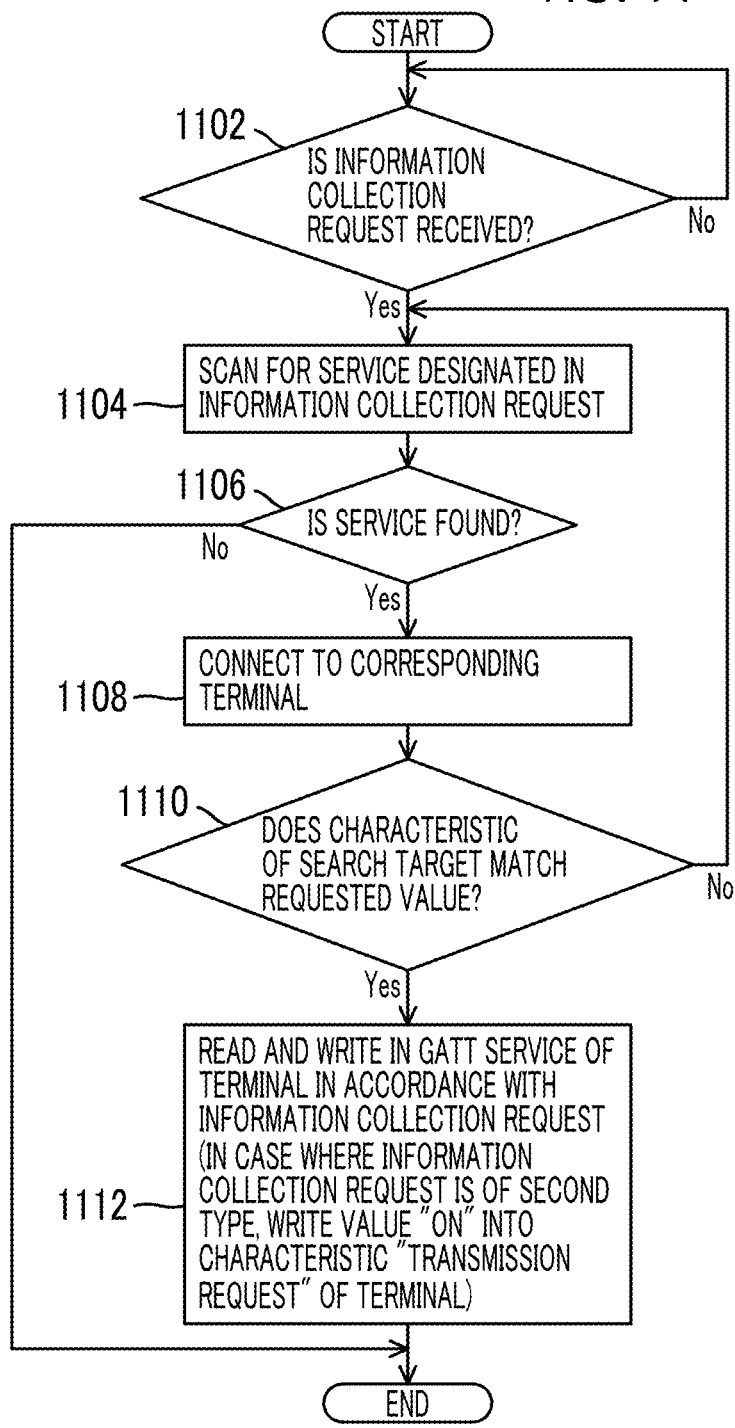
FIG. 11 is a diagram illustrating a processing procedure executed by a proxy apparatus of the modification example.

An example of a processing procedure of the multifunction peripheral 102B in this modification example will be described with reference to FIG. 11.

Blocks 1102 to 1110 of this procedure show the same processing as Blocks 702 to 710 in FIG. 7. In a case where a determination that the connected terminal 104 is the search target is made in Block 1110, the multifunction peripheral 102B reads and writes information in the GATT service of the terminal 104 in accordance with the information collection request (1112). That is, in a case where the information collection request is of the first type, the multifunction peripheral 102B in Block 1112 reads information from the terminal 104 in Blocks 712 and 714 of the procedure in FIG. 7 and responds to the multifunction peripheral 102A with the information. In a case where the information collection request is of the second type, the multifunction peripheral 102B writes "ON" into the value of the characteristic "transmission request" of the terminal 104.

Figure 12:
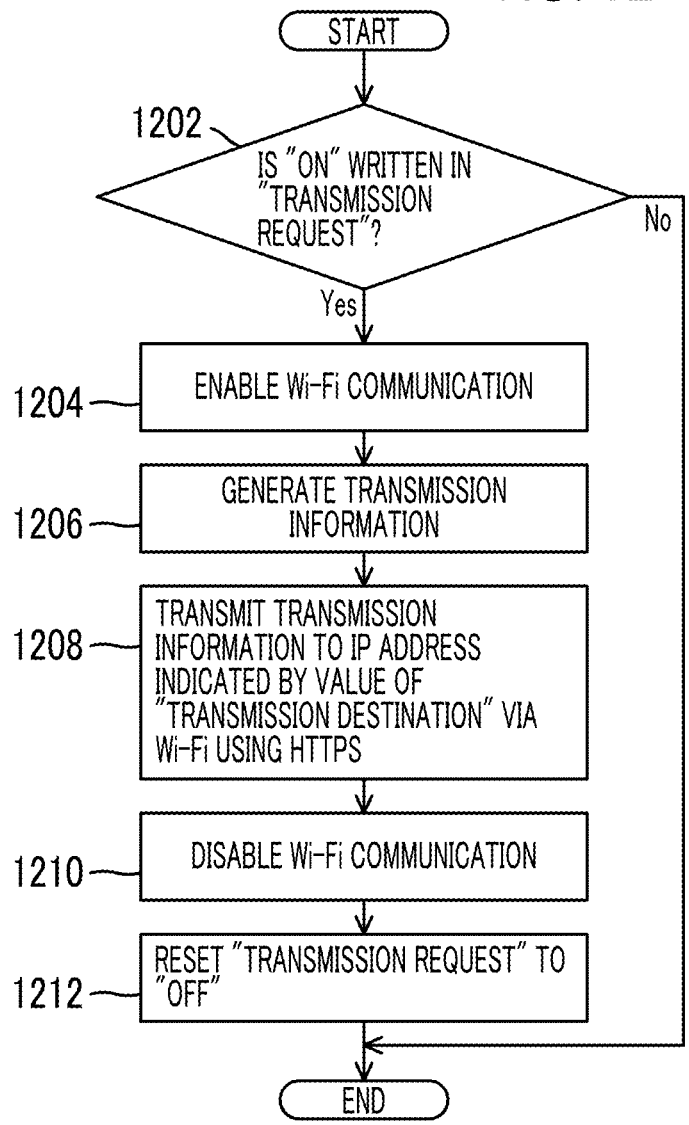
FIG. 12 is a diagram illustrating a processing procedure executed by the terminal of the modification example.

Next, an example of a processing procedure of the terminal 104 in this modification example will be described with reference to FIG. 12. This processing procedure is a procedure that is executed by the terminal 104 in a case where the confidentiality transmission instruction is received from the multifunction peripheral 102B in accordance with the second type of information collection request (that is, in a case where "ON" is written into the characteristic "transmission request").

In this procedure, the terminal 104 monitors the value of the characteristic "transmission request" in the GATT service (1202). In a case where "ON" is written into the value of "transmission request", the terminal 104 enables the Wi-Fi communication function of the network interface 310 (refer to FIG. 3) (1204). Normally, the Wi-Fi communication function is disabled in the terminal 104 for power saving. In addition, the terminal 104 generates transmission information to be transmitted to the collection apparatus in accordance with the confidentiality transmission instruction (1206). An example of the transmission information described in the JSON format is illustrated below.

{"Service UUID": "1BA1EEF4-E76C-4D5B-A7C4-5086DB143B44",
"Characteristics": [
{"UUID": "5F2112A1-B5E5-4786-81A1-9973A886338F",
"Value": "AZ3857"},
{"UUID": "147BE099-6B56-4DC3-BCDC-E6FC5BC52BAB",
"Value": "70"},
{"UUID": "16020D5F-51DE-465A-87BB-5DD7E81FF2F5",
"Value": "36.2"}]}

This example is an example of information that is transmitted for the health management service as described in the exemplary embodiment. As illustrated, the transmission information includes the UUID "1BA1EEF4-E76C-4D5B-A7C4-5086DB143B44" of the service followed by several characteristics. The first characteristic is the UUID indicating the employee ID and the value of the employee ID. The next characteristic is the UUID and the value of the heart rate. The last characteristic is the UUID and the value of the body temperature. In a case where the terminal 104 receives the confidentiality transmission instruction for a certain service, for example, the terminal 104 is programmed to generate the transmission information including the remaining characteristics of the service except the transmission destination and the transmission request.

Next, the terminal 104 performs hypertext transfer protocol secure (HTTPS) access to the IP address indicated by the value of the characteristic of the transmission destination, that is, the multifunction peripheral 102A, using the Wi-Fi communication function and transmits the transmission request to the IP address (1208). Then, the terminal 104 disables the Wi-Fi communication function (1210) and changes the value of the characteristic of the transmission request to "OFF" (1212). While transfer path encryption based on HTTPS is used here, the transmission information may be protected by other types of encryption.

As described above, in this modification example, information of the confidentiality target is directly transmitted to the collection apparatus from the terminal 104 not via the proxy apparatus. Thus, secrecy of the information is easily maintained.

While an example in which whether or not information to be collected is the confidentiality target is determined in units of services is illustrated in the processing procedure in FIG. 9, this is merely one example. For example, as another example, an example in which whether or not information to be collected is the confidentiality target is determined in units of users (that is, in units of terminals 104) maybe available. In such an example, the collection apparatus may have information indicating whether or not the user or the terminal 104 is the confidentiality target in association with the identification information (for example, the employee ID) of the user or the terminal 104.

While the collection apparatus and the proxy apparatus are multifunction peripherals in the exemplary embodiment and the modification example described above, computer-incorporating apparatuses of types other than the multifunction peripheral like a personal computer, a kiosk terminal, and a vending machine may be used as the collection apparatus and the proxy apparatus.

While the terminal 104 incorporates the sensors detecting biometric information such as the heart rate and the body temperature in the exemplary embodiment, this is merely one example. The terminal 104 may detect a state of a person or an object wearing the terminal 104 using other types of sensors.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information collection system comprising:
a plurality of terminal devices comprising a first terminal and a second terminal;
a collection apparatus comprising a first processor; and
one or more proxy apparatuses, each comprising a second processor,
wherein the first processor of the collection apparatus is configured to:
collect information from a first terminal by communication using a first communication method,
in a case where the information is collected by the first terminal but not collected from the second terminal using the first communication method, transmit an information collection request for the second terminal to the one or more proxy apparatuses but not to the first terminal for the second terminal to transmit the information to the collection apparatus by communication using a second communication method,
determine whether the information of the second terminal is a confidentiality target,
collect the information of the second terminal through at least one proxy apparatus of the one or more proxy apparatuses in response to receiving the information collection request and the information of the second terminal is not the confidentiality target,
the first processor of the collection apparatus, in a case where the information of the second terminal is determined as the confidentiality target, is configured to transmit the information collection request to at least one of the one or more proxy apparatuses to instruct the second terminal to transmit the information directly to the collection apparatus by communication using the second communication method in accordance with the information collection request including the confidentiality instruction,
the second processor of the at least one proxy apparatus of the one or more proxy apparatuses, in a case where the confidentiality instruction is included in the information collection request from the collection apparatus, is configured to transmit the information collection request to the second terminal by communication using the first communication method, the transmission instruction providing an instruction to transmit the information directly from the second terminal to the collection apparatus by communication using the second communication method, and
the second terminal, in a case where the transmission instruction is received, is configured to transmit the information of the second terminal to the collection apparatus by communication using the second communication method.

2. The information collection system according to claim 1, wherein the first communication method is a communication method that saves more power than the second communication method, and
The first terminal normally waits for communication in the first communication method from the collection apparatus or the one or more proxy apparatuses by disabling the second communication method, and in a case where the transmission instruction is received from the one or more proxy apparatuses by communication using the first communication method, enables the second communication method and transmits the information of the first terminal to the collection apparatus by communication using the second communication method.

3. The information collection system according to claim 1, wherein the first communication method is short-range wireless communication, and
the first terminal,
in a case of pairing with the collection apparatus for the short-range wireless communication, acquires and stores a communication address of the collection apparatus in the second communication method from the collection apparatus, and
in a case where the transmission instruction is received, transmits the information of the first terminal to the stored communication address of the collection apparatus by communication using the second communication method.

4. The information collection system according to claim 2, wherein the first communication method is short-range wireless communication, and the first terminal,
in a case of pairing with the collection apparatus for the short-range wireless communication, acquires and stores a communication address of the collection apparatus in the second communication method from the collection apparatus, and
in a case where the transmission instruction is received, transmits the information of the first terminal to the stored communication address of the collection apparatus by communication using the second communication method.

5. The information collection system according to claim 1,
wherein the information collection request includes service identification information for identifying a service, terminal identification information for identifying the first terminal, and information identification information for identifying information on a collection target,
the first terminal stores service identification information of a service to which the first terminal corresponds, and
the second processor of the one or more proxy apparatuses, by communication using the first communication method, is configured to search for the first terminal having a combination of the service identification information and the terminal identification information included in the information collection request from the collection apparatus and collects the information corresponding to the information identification information from the first terminal found by searching.

6. The information collection system according to claim 1, wherein the information collection request includes service identification information for identifying a service, terminal identification information for identifying the first terminal, and information identification information for identifying information on a collection target,
the first terminal stores service identification information of a service to which the terminal corresponds, and
the second processor of the one or more proxy apparatuses, by communication using the first communication method, is configured to search for the first terminal having a combination of the service identification information and the terminal identification information included in the information collection request from the collection apparatus and collects the information corresponding to the information identification information from the first terminal found by searching.

7. The information collection system according to claim 2,
wherein the information collection request includes service identification information for identifying a service, terminal identification information for identifying the first terminal, and information identification information for identifying information on a collection target,
the first terminal stores service identification information of a service to which the terminal corresponds, and
the second processor of the one or more proxy apparatuses, by communication using the first communication method, is configured to search for the first terminal having a combination of the service identification information and the terminal identification information included in the information collection request from the collection apparatus and collects the information corresponding to the information identification information from the first terminal found by searching.

8. The information collection system according to claim 3,
wherein the information collection request includes service identification information for identifying a service, terminal identification information for identifying the first terminal, and information identification information for identifying information on a collection target,
the terminal stores service identification information of a service to which the first terminal corresponds, and
the second processor of the one or more proxy apparatuses, by communication using the first communication method, is configured to search for the first terminal having a combination of the service identification information and the terminal identification information included in the information collection request from the collection apparatus and collects the information corresponding to the information identification information from the first terminal found by searching.

9. The information collection system according to claim 4,
wherein the information collection request includes service identification information for identifying a service, terminal identification information for identifying the first terminal, and information identification information for identifying information on a collection target,
the terminal stores service identification information of a service to which the first terminal corresponds, and
the second processor of the one or more proxy apparatuses, by communication using the first communication method, is configured to search for the first terminal having a combination of the service identification information and the terminal identification information included in the information collection request from the collection apparatus and collects the information corresponding to the information identification information from the first terminal found by searching.

10. An information processing apparatus comprising:
a processor configured to
collect information from a plurality of terminals comprising a first terminal and a second terminal by communication using a first communication method;
in a case where the information is collected from the first terminal but not collected from the second terminal using the first communication method, transmit an information collection request for the second terminal to one or more proxy apparatuses, each comprises an individual processor, for the second terminal to transmit the information to the information processing apparatus by communication using a second communication method;
determine whether the information of the second terminal is a confidentiality target;
collect the information of the second terminal through at least one proxy apparatus of the one or more proxy apparatuses in response to receiving the information collection request and the information of the second terminal is not the confidentiality target,
in a case where the information of the terminal is determined as the confidentiality target, transmits the information collection request including a confidentiality instruction to at least one of the one or more proxy apparatuses to instruct the second terminal to directly transmit the information to the information processing apparatus by communication using the second communication method,
transmit to at least one proxy apparatus of the one or more proxy apparatuses the confidentiality instruction included in the information collection request; and
receive, directly from the second terminal, the information using the second communication method in the case where the information collection request includes the confidentiality information.

* * * * *